US009185721B2

(12) United States Patent
Du et al.

(10) Patent No.: US 9,185,721 B2
(45) Date of Patent: Nov. 10, 2015

(54) RANDOM ACCESS PREAMBLE TRANSMISSION DESIGN WITH MULTIPLE AVAILABLE RANDOM ACCESS CHANNEL RESOURCES

(71) Applicant: Nokia Solutions and Networks Oy, Espoo (FI)

(72) Inventors: Lei Du, Beijing (CN); Min Huang, Bejing (CN); Yong Teng, Bejing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/262,881

(22) Filed: Apr. 28, 2014

(65) Prior Publication Data
US 2014/0269570 A1    Sep. 18, 2014

Related U.S. Application Data

(63) Continuation of application No. 12/611,353, filed on Nov. 3, 2009, now abandoned.

(51) Int. Cl.
*H04W 72/04* (2009.01)
*H04W 74/00* (2009.01)
(Continued)

(52) U.S. Cl.
CPC ........ *H04W 72/1278* (2013.01); *H04W 74/002* (2013.01); *H04W 72/042* (2013.01); *H04W 72/0413* (2013.01); *H04W 74/0833* (2013.01)

(58) Field of Classification Search
CPC .................... H04W 74/0833; H04W 72/0406; H04W 72/042; H04W 72/04; H04W 56/0005; H04W 56/00; H04W 74/002; H04W 74/004; H04W 74/006

USPC .......................................... 455/450–453, 455
See application file for complete search history.

(56) References Cited

U.S. PATENT DOCUMENTS

| 8,427,971 | B2 | 4/2013 | Fischer et al. | ................. 370/252 |
| 8,811,305 | B2 * | 8/2014 | Li et al. | ......................... 370/329 |

(Continued)

FOREIGN PATENT DOCUMENTS

| EP | 1973366 A2 | 9/2008 |
| WO | WO 2008023932 A1 | 2/2008 |
| WO | WO 2008111821 A1 | 9/2008 |

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.4.0, Mar. 2008, 126 pgs.

(Continued)

*Primary Examiner* — Nam Huynh
(74) *Attorney, Agent, or Firm* — Harrington & Smith

(57) ABSTRACT

A method for use of a RA preamble with multiple available RACH resources is described. The method includes allocating resources including a plurality of RACH resources for a UE. Information that indicates a dedicated preamble and the allocated resources is sent to the UE. The UE receives the information. A response including the dedicated preamble is generated at the UE. The method also includes the UE sending the response over at least two of the allocated resources. In response to receiving at least one response, a message is transmitted to the UE. Apparatus and computer readable media are also described.

14 Claims, 7 Drawing Sheets

(51) Int. Cl.
*H04W 72/12* (2009.01)
*H04W 74/08* (2009.01)

(56) References Cited

U.S. PATENT DOCUMENTS

| | | | |
|---|---|---|---|
| 2003/0026324 A1 | 2/2003 | Li et al. | |
| 2008/0194259 A1 | 8/2008 | Vujcic et al. | 455/435.1 |
| 2009/0042582 A1 | 2/2009 | Wang et al. | 455/450 |
| 2010/0216483 A1 | 8/2010 | Tynderfeldt et al. | 455/450 |
| 2010/0309877 A1 | 12/2010 | Damnjanovic et al. | 370/331 |

OTHER PUBLICATIONS

"3$^{rd}$ Generation Partnership Project; Technical Specification Group Radio Access Network; Evolved Universal Terrestrial. Radio Access (E-UTRA); Physical Channels and Modulation (Release 8)", 3GPP TS 36.211 V8.2.0, Mar. 2008, 67 pgs.

"3$^{rd}$ General Partnership Project; Technical Specification Group Radio Access Network; Evolved Universal Terrestrial Radio Access (E-UTRA) Medium Access Control (MAC) protocol specification (Release 8)", 3GPP TS 36.321 V8.2.0, May 2008, 33 pgs.

"PRACH resource selection", Nokia Corporation, 3GPP TSG-RAN WG2 Meeting #63bis, R2-085080, Sep.-Oct. 2008, 3 pgs.

"PRACH assignment for dedicated preambles", Nokia Corporation, 3GPP TSG-RAN WG2 Meeting #63bis, R2-085082, Sep.-Oct. 2008, 2 pgs.

"Dedicated Preamble Assignment", Ericsson, 3GPP TSG-RAN WG2 #63bis, R2-085260, Sep.-Oct. 2008, 5 pgs.

"Text Proposal for Dedicated Preamble Assignment", Ericsson, 3GPP TSG-RAN2 Meeting #63bis, R2-085261, Sep.-Oct. 2008, 8 pgs.

"PRACH resource indication for dedicated preamble", ZTE, CATT Huawei, 3GPP TSG RAN WG2 #63bis, R2-085816, Sep.-Oct. 2008, 5 pgs.

MAC Rapporteurs et al: "E-UTRA MAC protocol specification update"; 3GPP Draft; vol. RAN WG2, No. Shenzhen, China, Mar. 25, 2008, XP050139431 [retrieved on Mar. 25, 2008] p. 13, paragraph 5.1.4; 3rd Generation Partnership Project (3GPP); Mobile Competence Centre; 650, Route des Lucioles; F-06921 Sophia-Antipolis Cedex; France.

CATT: "Consideration on the PRACH indication for dedicated preamble allocation"; 3GPP Draft; R2-085686; No. Prague, Czech Republic; Sep. 25, 2008, XP050320465 [retrieved on Sept 25, 2008] the whole document; 3rd Generation Partnership Project (3GPP); Mobile Competence Centre; 650, Route des Lucioles; F-06921 Sophia-Antipolis Cedex; France.

3GPP Ts 36.300 V8.6.0 (Sep. 2008) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; pp. 1-137; 3rd Generation Partnership Project (3GPP); Mobile Competence Centre; 650, Route des Lucioles; F-06921 Sophia-Antipolis Cedex; France.

\* cited by examiner

RANDOM ACCESS PREAMBLE TRANSMISSION DESIGN WITH MULTIPLE AVAILABLE RANDOM ACCESS CHANNEL RESOURCES

CROSS-REFERENCE TO RELATED APPLICATIONS

This application is a continuation of U.S. patent application Ser. No. 12/611,353, filed on Nov. 3, 2009, now abandoned, the disclosure of which is incorporated herein by reference in its entirety, and which claims the benefit of U.S. Provisional Application No. 61/198,305, filed Nov. 3, 2008.

TECHNICAL FIELD

The exemplary and non-limiting embodiments of this invention relate generally to wireless communication systems, methods, devices and computer programs and, more specifically, relate to transmission of a random access preamble with multiple available random access channel resources.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
DL downlink (eNB towards UE)
eNB E-UTRAN Node B (evolved Node B)
E-UTRAN evolved UTRAN (LTE)
FDD frequency division duplex
HO handover
LTE long term evolution
MAC medium access control
MM/MME mobility management/mobility management entity
Node B base station
O&M operations and maintenance
OFDMA orthogonal frequency division multiple access
PDCP packet data convergence protocol
PHY physical
PRACH physical random access channels
RA random access
RACH random access channels
RLC radio link control
RRC radio resource control
RSRP reference signal received power
SC-FDMA single carrier, frequency division multiple access
S-GW serving gateway
TDD time division duplex
TTI transmission time interval
UE user equipment
UL uplink (UE towards eNB)
UTRAN universal terrestrial radio access network A communication system known as evolved UTRAN (E-UTRAN, also referred to as UTRAN-LTE or as E-UTRA) is currently under development within the 3GPP. As presently specified the DL access technique will be OFDMA, and the UL access technique will be SC-FDMA.

One specification of interest is 3GPP TS 36.300, V8.6.0 (2008 September), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1 reproduces FIG. 4.1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

The eNB may host the following functions:

functions for Radio Resource Management: Radio Bearer Control, Radio Admission Control, Connection Mobility Control, Dynamic allocation of resources to UEs in both uplink and downlink (scheduling);
IP header compression and encryption of the user data stream;
selection of a MME at UE attachment;
routing of User Plane data towards the Serving Gateway;
scheduling and transmission of paging messages (originated from the MME);
scheduling and transmission of broadcast information (originated from the MME or O&M); and
a measurement and measurement reporting configuration for mobility and scheduling.

As illustrated in 3GPP TS 36.300 V8.4.0 (2008 March), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), a random access (RA) procedure may be performed for at least the following five events:

1) Initial access from a RRC_IDLE state;
2) Initial access after a radio link failure;
3) A handover (HO) requiring a random access procedure;
4) DL data arrival during a RRC_CONNECTED state requiring a random access procedure (e.g., when the UL synchronization status is "non-synchronized"); and
5) UL data arrival during a RRC_CONNECTED state requiring a random access procedure (e.g., when UL synchronization status is "non-synchronized" or there are no PUCCH resources for SR available.

The random access procedure in 3GPP TS 36.300 may take a contention based form, which is applicable to all five events, and a non-contention based form, which is applicable to the handover and DL data arrival events. The random access process may include four steps for a contention based RA or three steps for a non-contention based RA, the steps corresponding to a message either from the UE to an eNB or from the eNB to the UE. These messages include: a RA preamble from the UE to an eNB (e.g., message 1); and a RA response from the eNB to the UE (e.g., message 2).

Once the RA preamble is transmitted, the UE 10 may monitor a PDCCH in the following TTI window for a random access response. The UE 10 could stop monitoring after a successful reception of a random access response corresponding to the RA preamble transmission.

A random access response window (RAR window) is defined as a subframe window where the UE 10 monitors the PDCCH for the possible random access response following a random access preamble transmission. As described in 3GPP TS 36.300, an example length of an RAR window may be between 2 ms to 10 ms, with an offset of 2 ms.

Multiple available PRACH resources as well as one dedicated preamble may be assigned via message 0 (e.g., a RA preamble assignment), to an UE 10, e.g., a UE 10 which has a DL data arrival or handover requirement. A dedicated preamble may be used by the assigned UE and not by any other UEs within a certain time (e.g., an expiry time). Multiple available PRACH resources are a subset of all PRACH resources in the system and may be spread along the time domain (in FDD and TDD) or the frequency domain (in TDD) as shown in 3GPP TS 36.211 v8.2.0 (2008 March), 3rd Generation Partnership Project; Technical Specification Group Radio Access Network; Evolved Universal Terrestrial Radio Access (E-UTRA); Physical Channels and Modulation (Release 8).

In TDD systems, if a preamble format 4 is used, 1 to 6 PRACH resources may be located along the frequency domain in the special subframe. The concepts of a PRACH Mask Index and validity pattern are used to indicate these available PRACH resources.

For further reference see R2-085260, Dedicated Preamble Assignment, Ericsson, RAN2#63b, Prague; R2-085261, Text Proposal for Dedicated Preamble Assignment, Ericsson, RAN2#63b, Prague; R2-085816, PRACH resource indication for dedicated preamble, CATT, Huawei, ZTE, RAN2#63b, Prague; and R2-085082, PRACH assignment for dedicated preambles, Nokia Corporation, Nokia Siemens Networks, RAN2#63b, Prague.

As shown in 3GPP TS 36.321 v8.2.0, when more than one PRACH resource is available in the same subframe (TDD), one of the PRACH resources are randomly selected for use. Any one of the allowed PRACH resources may be chosen with equal probability. This regulation corresponds to a contention based random access.

SUMMARY

The below summary section is intended to be merely exemplary and non-limiting.

The foregoing and other problems are overcome, and other advantages are realized, by the use of the exemplary embodiments of this invention.

In a first aspect thereof the exemplary embodiments of this invention provide a method for use of a RA preamble with multiple available RACH resources. The method includes allocating resources including a plurality of RACH resources for a UE. Information that indicates a dedicated preamble and the allocated resources is sent to the UE. The method includes receiving at least one response including the dedicated preamble over at least one of the allocated resources. In response to receiving the at least one response, transmitting a response to the UE is also included in the method.

In a further aspect thereof the exemplary embodiments of this invention provide a method for use of a RA preamble with multiple available RACH resources. The method includes receiving information that indicates a dedicated preamble and allocated resources including a plurality of RACH resources. A response including the dedicated preamble is generated. The method also includes sending the response over at least two of the allocated resources.

In another aspect thereof the exemplary embodiments of this invention an apparatus for use of a RA preamble with multiple available RACH resources. The apparatus includes one or more processor and one or more memory which includes computer program code. The one or more memory and the computer program code configured to, with the one or more processor, cause the apparatus to perform operations. The operations include to allocate resources including a plurality of RACH resources for a UE; to send information that indicates a dedicated preamble and the allocated resources to the UE; to receive at least one response including the dedicated preamble over at least one of the allocated resources; and to transmit, in response to receiving the at least one response, a response to the UE.

In a further aspect thereof the exemplary embodiments of this invention provide a computer readable medium tangibly encoding a computer program comprising program instructions, execution of the program instructions resulting in actions for use of a RA preamble with multiple available RACH resources. The actions include allocating resources including a plurality of RACH resources for a UE; sending information that indicates a dedicated preamble and the allocated resources to the UE; receiving at least one response including the dedicated preamble over at least one of the allocated resources; and in response to receiving the at least one response, transmitting a response to the UE.

In another aspect thereof the exemplary embodiments of this invention provide an apparatus for use of a RA preamble with multiple available RACH resources. The apparatus includes means for allocating resources including a plurality of RACH resources for a UE; means for sending information that indicates a dedicated preamble and the allocated resources to the UE; means for receiving at least one response including the dedicated preamble over at least one of the allocated resources; and means for, in response to receiving the at least one response, transmitting a response to the UE.

In a further aspect thereof the exemplary embodiments of this invention provide an apparatus for use of a RA preamble with multiple available RACH resources. The apparatus includes one or more processor and one or more memory which includes computer program code. The one or more memory and the computer program code configured to, with the one or more processor, cause the apparatus to perform operations. The operations include to allocate resources including to receive information that indicates a dedicated preamble and allocated resources including a plurality of RACH resources; to generate a response including the dedicated preamble; and to send the response over at least two of the allocated resources.

In another aspect thereof the exemplary embodiments of this invention provide a computer readable medium tangibly encoding a computer program comprising program instructions, execution of the program instructions resulting in actions for use of a RA preamble with multiple available RACH resources. The actions include receiving information that indicates a dedicated preamble and allocated resources including a plurality of RACH resources; generating a response including the dedicated preamble; and sending the response over at least two of the allocated resources.

In a further aspect thereof the exemplary embodiments of this invention provide an apparatus for use of a RA preamble with multiple available RACH resources. The apparatus includes means for receiving information that indicates a dedicated preamble and allocated resources including a plurality of RACH resources; means for generating a response including the dedicated preamble; and means for sending the response over at least two of the allocated resources.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Figure 2:
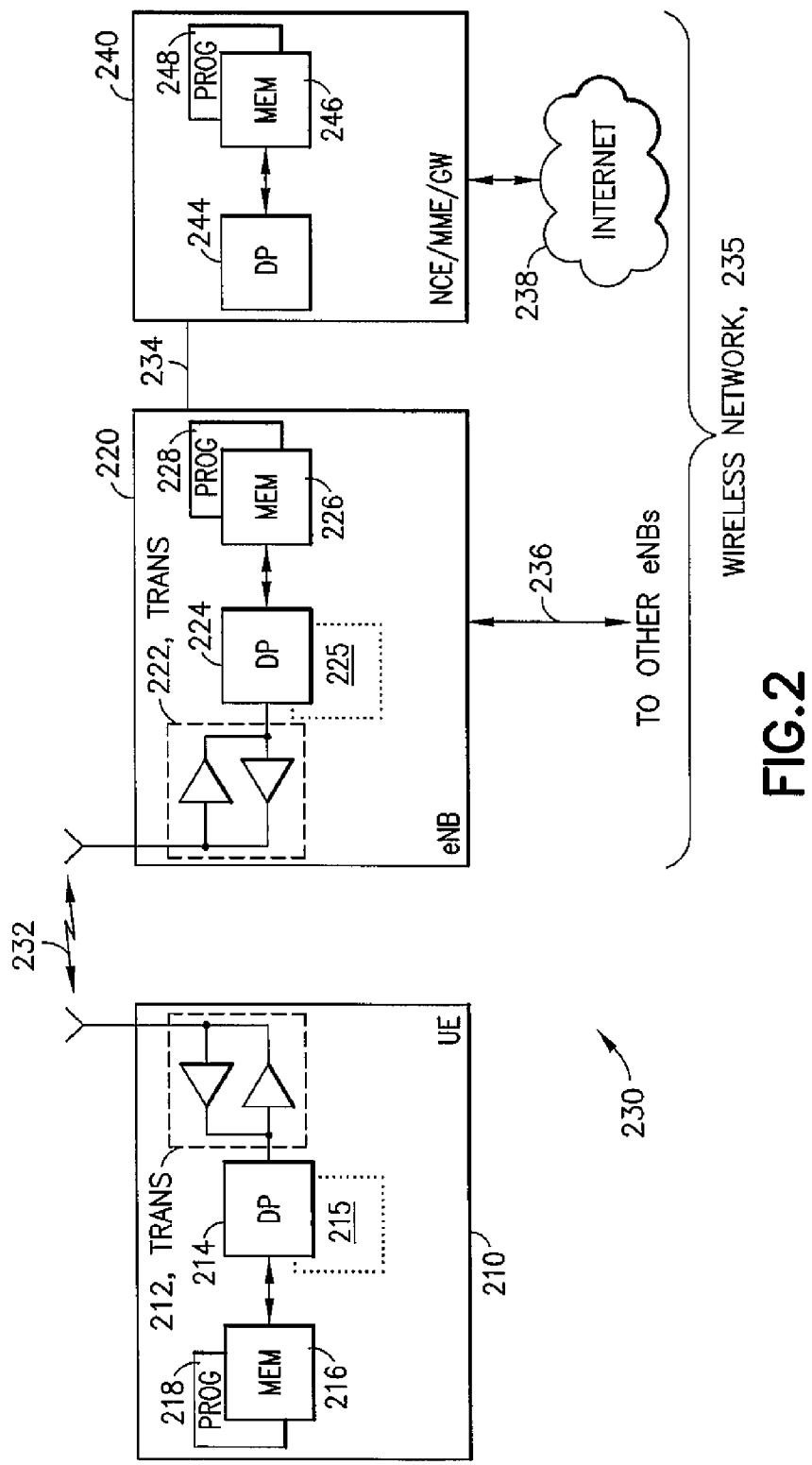
FIG. 2 shows a simplified block diagram of various exemplary electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention.

Figure 1:
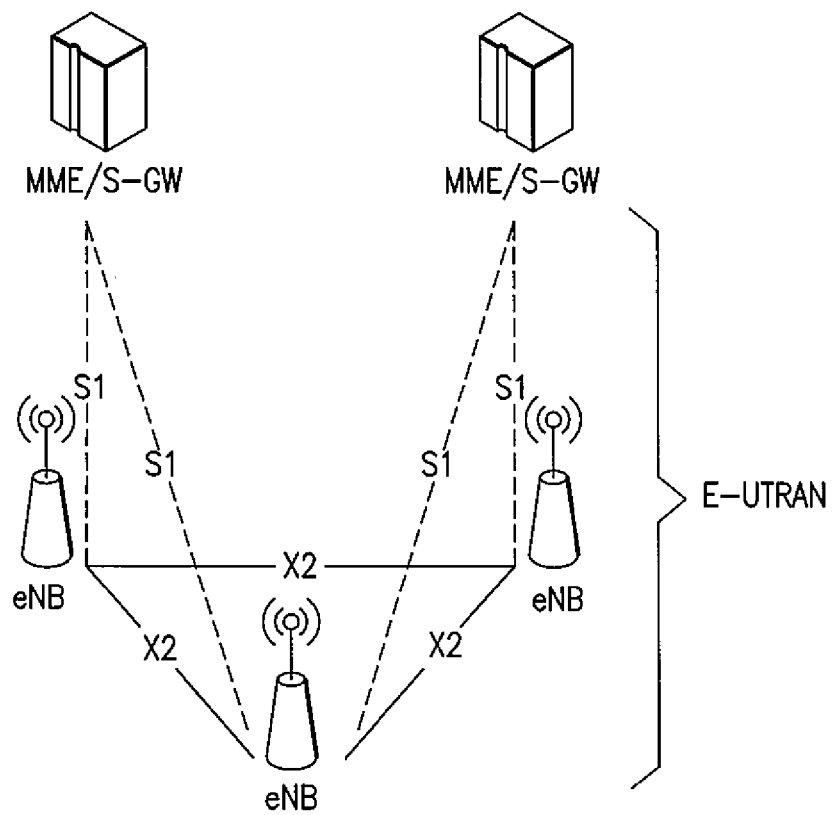
FIG. 1 reproduces FIG. 4 of 3GPP TS 36.300, and shows the overall architecture of the E-UTRAN system.

In the wireless system 230 of FIG. 2, a wireless network 235 is adapted for communication over a wireless link 232 with an apparatus, such as a mobile communication device which may be referred to as a UE 210, via a network access node, such as a Node B (base station), and more specifically an eNB 220. The network 235 may include a network control element (NCE) 240 that may include the MME/S GW functionality shown in FIG. 1, and which provides connectivity with a network, such as a telephone network and/or a data communications network (e.g., the internet 238).

The UE 210 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 220 via one or more antennas.

The eNB 220 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 210 via one or more antennas. The eNB 220 is coupled via a data/control path 234 to the NCE 240. The path 234 may be implemented as the S1 interface shown in FIG. 1. The eNB 220 may also be coupled to another eNB via data/control path 236, which may be implemented as the X2 interface shown in FIG. 1.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail.

That is, the exemplary embodiments of this invention may be implemented at least in part by computer software executable by the DP 214 of the UE 210, by the DP 224 of the eNB 220, and/or by the DP 244 of the eNB 240, or by hardware, or by a combination of software and hardware (and firmware). The UE 210 and the eNB 220 may also include dedicated processors, for example scheduler 215 and scheduler 225.

In general, the various embodiments of the UE 210 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

Figure 3:
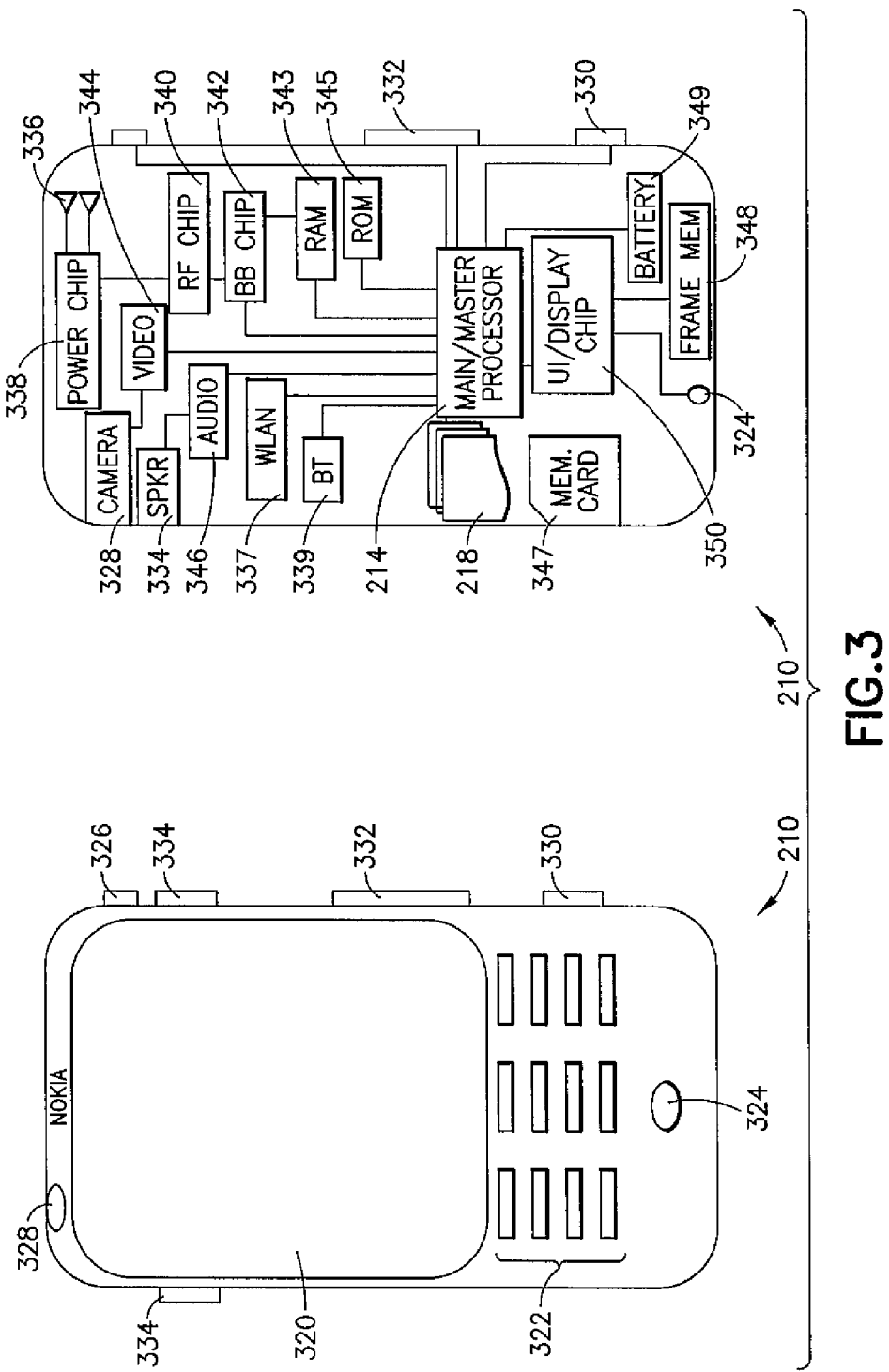
FIG. 3 shows a more particularized block diagram of an exemplary user equipment such as that shown at FIG. 2.

FIG. 3 illustrates further detail of an exemplary UE in both plan view (left) and sectional view (right), and the invention may be embodied in one or some combination of those more function-specific components. The UE 210 has a graphical display interface 320 and a user interface 322 illustrated as a keypad but understood as also encompassing touch-screen technology at the graphical display interface 320 and voice-recognition technology received at the microphone 324. A power actuator 326 controls the device being turned on and off by the user.

The exemplary UE 210 may have a camera 328 which is shown as being forward facing (e.g., for video calls) but may alternatively or additionally be rearward facing (e.g., for capturing images and video for local storage). The camera 328 is controlled by a shutter actuator 330 and optionally by a zoom actuator 332 which may alternatively function as a volume adjustment for the speaker(s) 334 when the camera 328 is not in an active mode.

Within the sectional view of FIG. 3 are seen multiple transmit/receive antennas 336 that are typically used for cellular communication. The antennas 336 may be multi-band for use with other radios in the UE. The operable ground plane for the antennas 336 is shown by shading as spanning the entire space enclosed by the UE housing though in some embodiments the ground plane may be limited to a smaller area, such as disposed on a printed wiring board on which the power chip 338 is formed.

The power chip 338 controls power amplification on the channels being transmitted and/or across the antennas that transmit simultaneously where spatial diversity is used, and amplifies the received signals. The power chip 338 outputs the amplified received signal to the radio-frequency (RF) chip 340 which demodulates and downconverts the signal for baseband processing. The baseband (BB) chip 342 detects the signal which is then converted to a bit-stream and finally decoded. Similar processing occurs in reverse for signals generated in the apparatus 210 and transmitted from it.

Signals to and from the camera 328 pass through an image/video processor 344, which may encode and decode the various image frames. A separate audio processor 346 may also be present controlling signals to and from the speakers 334 and the microphone 324. The graphical display interface 320 may be refreshed from a frame memory 348 as controlled by a user interface chip 350 which may process signals to and from the display interface 320 and/or additionally process user inputs from the keypad 322 and elsewhere.

Certain embodiments of the UE 210 may also include one or more secondary radios such as a wireless local area network radio WLAN 337 and a Bluetooth® radio 339, which may incorporate an antenna on-chip or be coupled to an off-chip antenna. Throughout the apparatus are various memories such as random access memory RAM 343, read only memory ROM 345, and in some embodiments removable memory such as the illustrated memory card 347. The various programs 218 are stored in one or more of these memories. All of these components within the UE 210 are normally powered by a portable power supply such as a battery 349.

Processors 338, 340, 342, 344, 346, 350, if embodied as separate entities in a UE 210 or eNB 220, may operate in a slave relationship to the main processor 214, 224, which may then be in a master relationship to them. Any or all of these various processors of FIG. 3 access one or more of the various memories, which may be on-chip with the processor or separate. Similar function-specific components that are directed toward communications over a network broader than a piconet (e.g., components 336, 338, 340, 342-345 and 347) may also be disposed in exemplary embodiments of the access node 220, which may have an array of tower-mounted antennas rather than the two shown at FIG. 3.

The various chips (e.g., 338, 340, 342, etc.) that were described above may be combined into a fewer number than described and, in a most compact case, may all be embodied physically within a single chip.

For non-contention based random access, one of the multiple available PRACH resources may be selected according to a given rule, e.g., a first in time domain and then in frequency domain as shown in R2-085080, PRACH resource selection, Nokia Corporation, Nokia Siemens Networks, RAN2#63b, Prague. Since all the PRACH resources and the dedicated preamble are assigned to a single UE 10 and can not used by other UEs with the same preamble, there could be no collision or ambiguity when the dedicated preamble is sent in these PRACH resources.

An exemplary embodiment in accordance with this invention provides a random access preamble (RA preamble) transmission design which is included in the random access (RA) process. The UE 10 may use all or a sub-set of the available PRACH resources. In a non-limiting example, these available PRACH resources are used to send the same dedicated preamble simultaneous. By doing so, frequency domain diversity may be obtained and the chance of experiencing low intra-cell or inter-cell interference is increased. Therefore, the chance for successful access is greatly increased, and hence the backoff and delay due to access failure are decreased.

A RA preamble may be transmitted using multiple available PRACH resources. The random access performance for the UE 10 using dedicated preamble can be greatly improved without causing much impact for other UEs.

Figure 5:
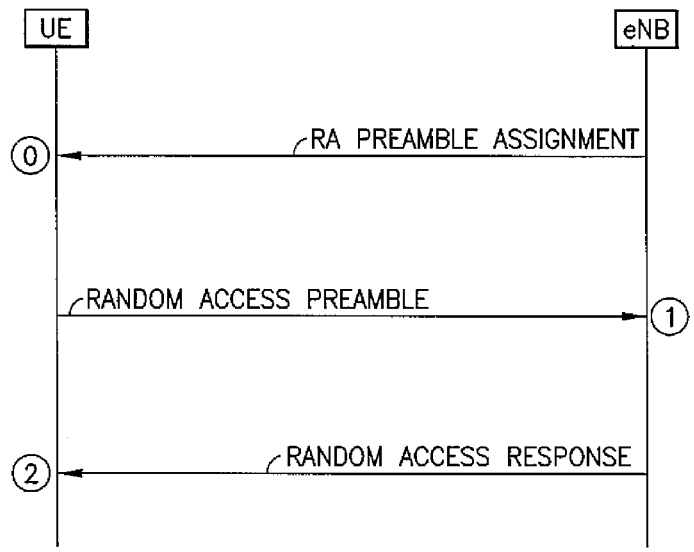
FIG. 5 displays an example algorithm flow for non-contention based random access with multiple available PRACH resources.
Figure 6:
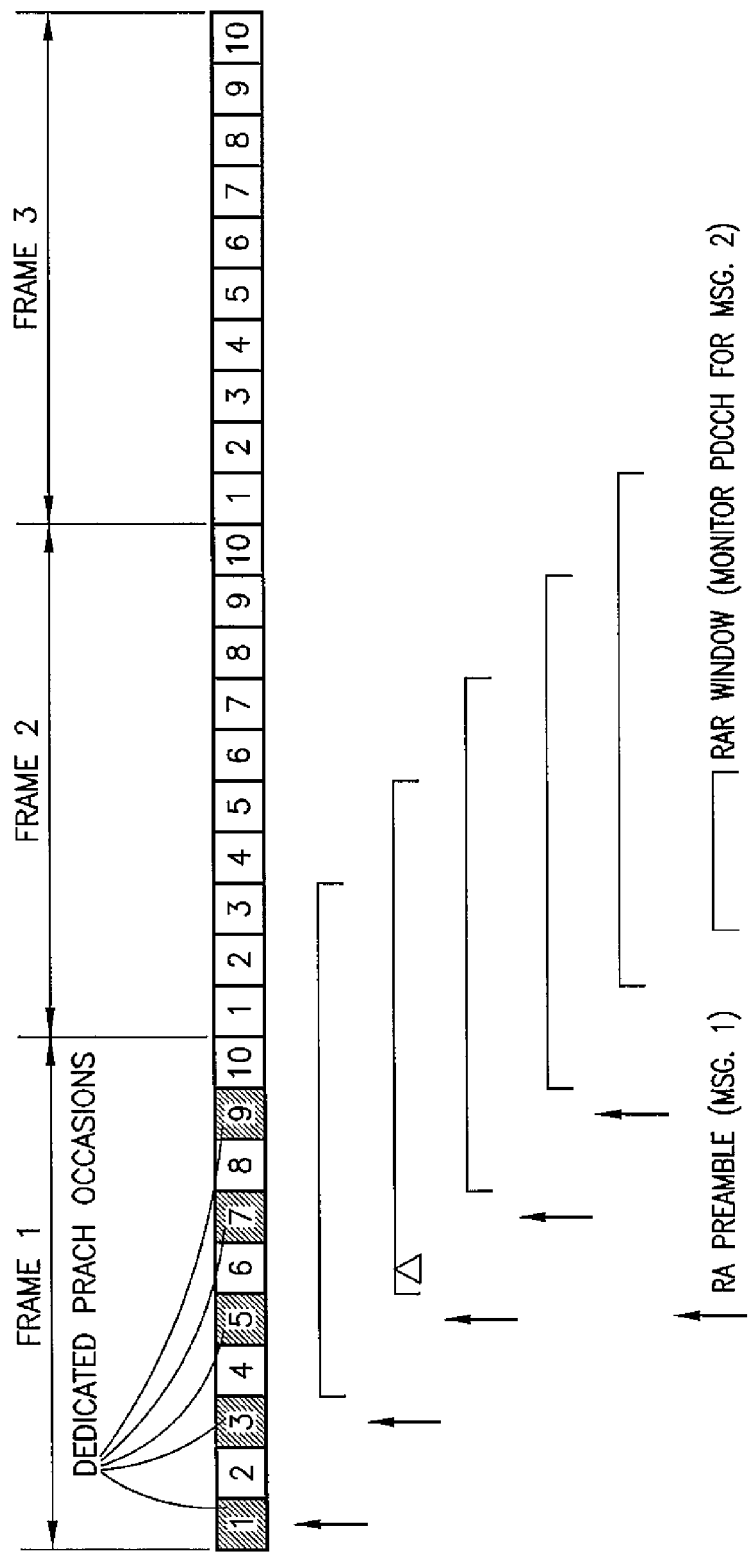
FIG. 6 shows an example diagram of PRACH resources spread along the time domain.
Figure 7:
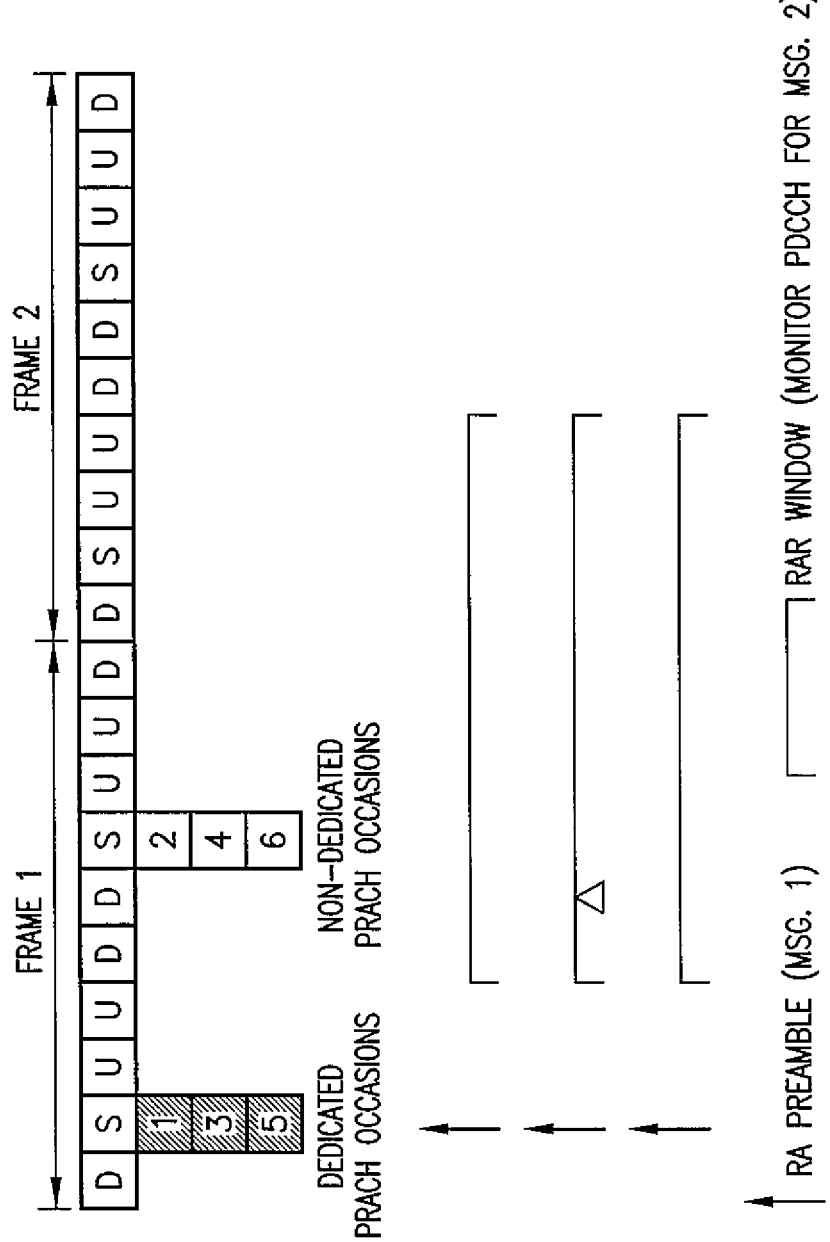
FIG. 7 shows an example diagram of PRACH resources spread along the frequency domain.

An exemplary basic scheme in accordance with this invention is shown in FIGS. 5-7. The basic scheme uses messages 0, 1 and 2 within a non-contention based RA. A UE 10 is assigned a dedicated preamble and multiple available PRACH resources by an eNB 220 via message 0. The PRACH resources to be used can be decided in a number of ways, for example by an explicit indication from the eNB 220 based on the PRACH resource status and the UE 10's pathloss, and by an implicit decision made by the UE 10 based on its link level, (e.g. by detecting a RSRP level).

The UE 10 can use a selected set of the PRACH resources representing a part of or all of available PRACH resources as indicated in the decision. These resources may be used to send the same dedicated RA preamble across the entire set of selected resources (e.g., during the same subframe/simultaneous). If multiple PRACH resources in one subframe are selected, the allocation of transmit powers on the PRACH resources can follow a given rule, e.g., power being evenly allocated and/or based on channel gain information for each frequency resource. This rule may be predefined, associated with the dedicated preamble assignment, etc.

When the eNB 220 detects the transmission of the dedicated preamble within one or more available PRACH resources which are associated with the dedicated preamble, the eNB 220 can combine the reception of preamble signals and respond to a randomly selected PRACH resource by sending a random access response (e.g., message 2) during a corresponding RAR window and not respond to any other identical preambles in associated PRACH resources.

When the UE 10 receives a message indicating a successful reception of at least one dedicated preamble, e.g., message 2, the UE 10 can stop transmitting the message in the other available PRACH resources.

FIG. 5 displays an example algorithm flow for non-contention based random access with multiple available PRACH resources. Message 0 is sent by the eNB 220 and indicates and assignment of at least one dedicated preamble and a plurality of PRACH. The UE 10 receives message 0, and when a RA procedure is necessary, the UE 10 sends the dedicated preamble (in message 1) across the multiple PRACH channels indicated by the eNB 220. The eNB 220 receives at least one of the transmissions of message 1 (or combines the reception of a plurality of transmissions) and, in response, sends a RA access response (message 2) with at least one of the used PRACH occasions.

FIG. 6 shows an example diagram of PRACH resources spread along the time domain. The UE 10 has dedicated PRACH occasions 1, 3, 5, 7 and 9. The UE 10 begins sending message 1 starting at occasion 1. Each transmission of message 1 provides a RAR window in which to receive an indication of a successful reception of the transmission (e.g., message 2). IF the UE 10 receives message 2 at occasion 6, the UE 10 may decide to cease transmitting message 1 and thus, not transmit message 1 in occasions 7 and 9.

Figure 4:
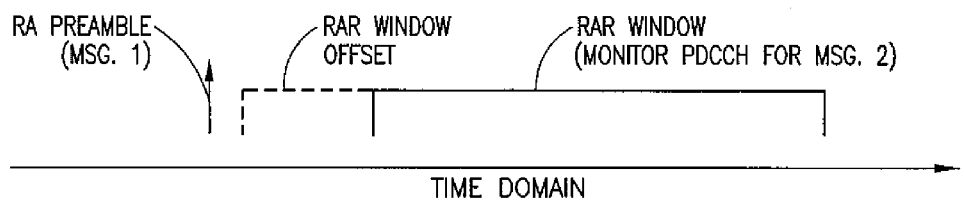
FIG. 4 illustration of the timing of RA preamble and RAR window

FIG. 4 shows an illustration of an example timing of a RA preamble and RAR window.

FIG. 7 shows an example diagram of PRACH resources spread along the frequency domain. Here, the UE 10 transmits on PRACH occasions 1, 3 and 5 simultaneously. The eNB 220 may receive the signals and send a single RA response to indicate either a success or failure for receiving the message from the UE 10.

Backoff processing is available in case all the preamble signals (e.g., message 1) fail to be properly received. Since the eNB 220 will respond with one backoff indication for each PRACH, the UE 10 will receive multiple backoff indications. The new backoff indication may override an older one, and if multiple indications arrival in one subframe, any one of them may be selected randomly. The UE 10 may use the final backoff value to calculate a delay time for a retransmission of message 1. Alternatively, the retransmission can follow the same pattern as the last transmission (e.g., simultaneous transmission in multiple PRACH resources) or follow only a part of that pattern (e.g. selecting one or part of the PRACH resources for retransmission).

In order to avoid access failure due to insufficient transceiver power resulting from simultaneous transmissions, some restriction may be made on the number of simultaneous transmission. For example, UEs 10 which are far away from the eNB 220 may use a rule such as "transmit on one PRACH resource". Alternatively, the number of simultaneous transmission may be calculated based on the channel situation, e.g., the path loss. Alternatively, the transmission mode, e.g. either transmitting in part of the PRACH resources or transmitting simultaneously on all the allocated PRACHs resources, can be signaled explicitly by eNB.

Upon access failure a backoff indication in message 2 could take effect. The eNB 220 could process all the message 1 signals containing the dedicated preamble together. However, the UE 10 can also receive multiple backoff indications since the UE 10 uses multiple PRACH resources. The UE 10 may follow the rule that the new backoff indication override the old one.

In a power ramping situation, the UE 10 can adjust the number of simultaneous transmission in the retransmission of the preamble, e.g., it can reduce the number of PRACH resources in frequency domain so that the transmit power can be concentrated into less frequencies and insufficient transmission power resulting from simultaneous transmission can be avoided. Alternatively, eNB can explicitly signal the number of PRACH resources on which the UE should transmit the dedicated preamble.

The exemplary embodiments in accordance with this invention provide a number of benefits. For example, where the selected multiple PRACH resources spread along the frequency domain, frequency domain diversity may be obtained in the detection of the dedicated preamble, and the successful access probability is increased. Where the selected multiple PRACH resources spread along either the time domain or frequency domain, the chance of experiencing low intra-cell or inter-cell interference in a single PRACH is increased. By increasing the number of messages sent, the chance of a successful access is increased greatly, and the backoff and delay due to access failure are decreased.

The performance of other UE 10 sending preambles (either dedicated or non-dedicated) in the same PRACH resources would not suffer much impact even though the intra-cell and inter-cell interference caused by the increased number of preamble transmission is actually enhanced. However, this impact is trivial and balanced by the benefit obtained by the non-contention based random access.

Based on the foregoing it should be apparent that the exemplary embodiments of this invention provide a method, apparatus and computer program(s) to provide for transmission of a random access preamble with multiple available PRACH resources.

Figure 8:
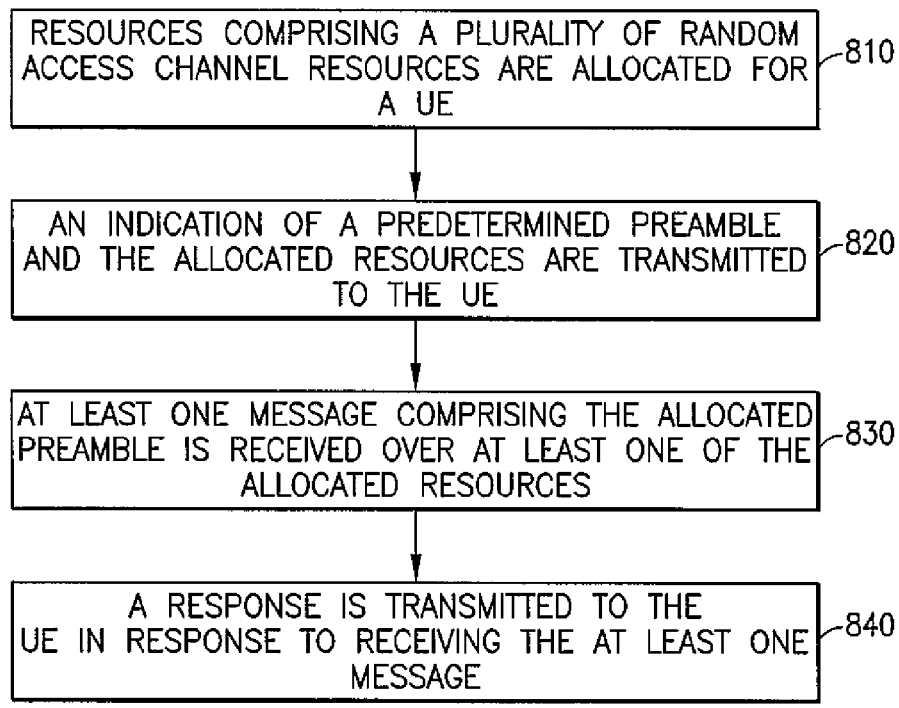
FIG. 8 is a logic flow diagram that illustrates the operation of a method, and a result of execution of computer program instructions embodied on a computer readable memory, in accordance with the exemplary embodiments of this invention.

FIG. 8 is a logic flow diagram that illustrates the operation of a method, and a result of execution of computer program instructions, in accordance with the exemplary embodiments of this invention. In accordance with these exemplary embodiments a method performs, at Block 810, resources comprising a plurality of random access channel resources are allocated for a UE. An indication of a predetermined preamble and the allocated resources are transmitted to the mobile station at block 820. At block 830, at least one message comprising the allocated preamble is received over at least one of the allocated resources. A response is transmitted to the mobile station in response to receiving the at least one message at block 840.

Figure 9:
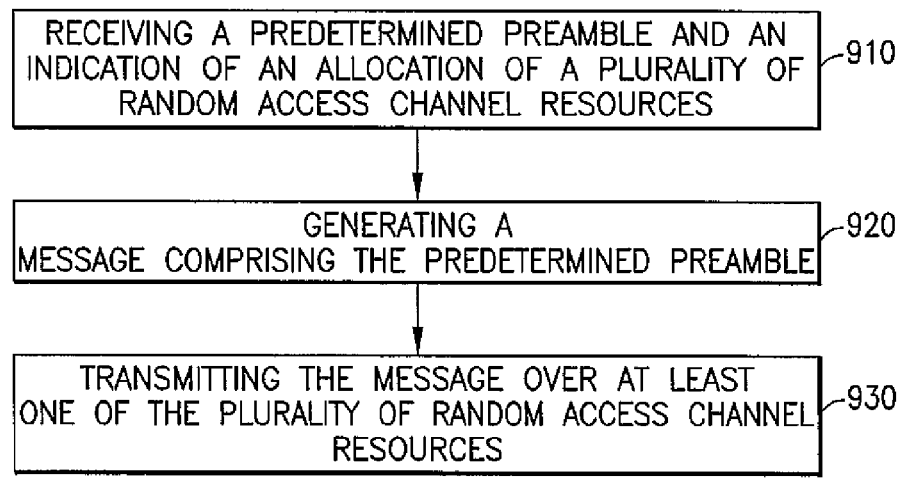
FIG. 9 is a logic flow diagram that illustrates the operation of an additional method, and a result of execution of computer program instructions embodied on a computer readable memory, in accordance with the exemplary embodiments of this invention.

FIG. 9 is a logic flow diagram that illustrates the operation of a method, and a result of execution of computer program instructions, in accordance with the exemplary embodiments of this invention. In accordance with these exemplary embodiments a method performs, at Block 910, a predetermined preamble and an indication of an allocation of a plurality of random access channel resources are received. A message comprising the predetermined preamble is generated at block 920. At block 930, the message is transmitted over at least one of the plurality of random access channel resources.

The various blocks shown in FIGS. 8 and 9 may be viewed as method steps, and/or as operations that result from operation of computer program code, and/or as a plurality of coupled logic circuit elements constructed to carry out the associated function(s).

An exemplary embodiment in accordance with this invention is a method for use of a RA preamble with multiple available RACH resources. The method includes allocating (e.g., by a processor) resources including a plurality of RACH resources for a UE. Information that indicates a dedicated preamble and the allocated resources is sent (e.g., by a transmitter) to the UE. The method includes receiving (e.g., by a receiver) at least one response including the dedicated preamble over at least one of the allocated resources. In response to receiving the at least one response, transmitting (e.g., by a transmitter) a response to the UE is also included in the method.

In a further exemplary embodiment of the method above, the method also includes, in response to not receiving the dedicated preamble in one of the at least one of the allocated resources, sending a backoff message to the UE.

In another exemplary embodiment of any one of the methods above, allocating the resources is based at least in part on link level information and/or pathloss information.

In a further exemplary embodiment of any one of the methods above, the allocated resources include a plurality of frequency domain resources and/or a plurality of time domain resources.

In another exemplary embodiment of any one of the methods above, the method also includes sending instructions to adjust transmission power to use when sending the at least one response. The instructions may instruct the UE to set the transmission power based at least in part on channel gain information. Alternatively, the instructions may instruct the UE, when sending the at least one response using a plurality of the at least one of the allocated resources, to set the transmission power evenly for the plurality of the at least one of the allocated resources.

A further exemplary embodiment in accordance with this invention is an apparatus for use of a RA preamble with multiple available RACH resources. The apparatus includes one or more processor and one or more memory which includes computer program code. The one or more memory and the computer program code configured to, with the one or more processor, cause the apparatus to perform operations. The operations include to allocate resources including a plurality of RACH resources for a UE; to send information that indicates a dedicated preamble and the allocated resources to the UE; to receive at least one response including the dedicated preamble over at least one of the allocated resources; and to transmit, in response to receiving the at least one response, a response to the UE.

In another exemplary embodiment of the apparatus above, the at least one memory and the computer program code are also configured to, with the at least one processor, cause the apparatus to, in response to not receiving the dedicated preamble in one of the at least one of the allocated resources, send a backoff message to the UE.

In a further exemplary embodiment of any one of the apparatus above, allocating the resources is based at least in part on link level information and/or pathloss information.

In another exemplary embodiment of any one of the apparatus above, the allocated resources include a plurality of frequency domain resources; and/or a plurality of time domain resources.

In a further exemplary embodiment of any one of the apparatus above, the at least one memory and the computer program code are also configured to, With the at least one processor, cause the apparatus to send instructions to adjust transmission power to use when sending the at least one response. The instructions may instruct the UE to set the transmission power based at least in part on channel gain information. Alternatively, the instructions may instruct the UE, when sending the at least one response using a plurality of the at least one of the allocated resources, to set the transmission power evenly for the plurality of the at least one of the allocated resources.

In another exemplary embodiment of any one of the apparatus above, the apparatus is embodied in an integrated circuit.

In a further exemplary embodiment of any one of the apparatus above, the apparatus is embodied in an mobile phone.

Another exemplary embodiment in accordance with this invention is a computer readable medium tangibly encoding a computer program comprising program instructions, execution of the program instructions resulting in actions for use of a RA preamble with multiple available RACH resources. The actions include allocating resources including a plurality of RACH resources for a UE; sending information that indicates a dedicated preamble and the allocated resources to the UE; receiving at least one response including the dedicated preamble over at least one of the allocated resources; and in response to receiving the at least one response, transmitting a response to the UE.

In a further exemplary embodiment of the computer readable medium above, the actions also include, in response to not receiving the dedicated preamble in one of the at least one of the allocated resources, sending a backoff message to the UE.

In another exemplary embodiment of any one of the computer readable media above, allocating the resources is based at least in part on link level information and/or pathloss information.

In a further exemplary embodiment of any one of the computer readable media above, the allocated resources include a plurality of frequency domain resources and/or a plurality of time domain resources.

In another exemplary embodiment of any one of the computer readable media above, the actions also include sending instructions to adjust transmission power to use when sending the at least one response. The instructions may instruct the UE to set the transmission power based at least in part on channel gain information. Alternatively, the instructions may instruct the UE, when sending the at least one response using a plurality of the at least one of the allocated resources, to set the transmission power evenly for the plurality of the at least one of the allocated resources.

A further exemplary embodiment in accordance with this invention is an apparatus for use of a RA preamble with multiple available RACH resources. The apparatus includes means for allocating (e.g., a processor) resources including a plurality of RACH resources for a UE; means for sending (e.g., a transmitter) information that indicates a dedicated preamble and the allocated resources to the UE; means for receiving (e.g., a receiver) at least one response including the dedicated preamble over at least one of the allocated resources; and means for, in response to receiving the at least one response, transmitting (e.g., a transmitter) a response to the UE.

In another exemplary embodiment of the apparatus above, the apparatus also includes means for, in response to not receiving the dedicated preamble in one of the at least one of the allocated resources, sending (e.g., a transmitter) a backoff message to the UE.

In a further exemplary embodiment of any one of the apparatus above, allocating the resources is based at least in part on link level information and/or pathloss information.

In another exemplary embodiment of any one of the apparatus above, allocated resources include a plurality of frequency domain resources and/or a plurality of time domain resources.

In a further exemplary embodiment of any one of the apparatus above, the apparatus also includes means for sending (e.g., a transmitter) instructions to adjust transmission power to use when sending the at least one response. The instructions may instruct the UE to set the transmission power based at least in part on channel gain information. Alternatively, the instructions may instruct the UE, when sending the at least one response using a plurality of the at least one of the allocated resources, to set the transmission power evenly for the plurality of the at least one of the allocated resources.

In another exemplary embodiment of any one of the apparatus above, the apparatus is embodied in an integrated circuit.

In a further exemplary embodiment of any one of the apparatus above, the apparatus is embodied in a base station (e.g., an eNB).

Another exemplary embodiment in accordance with this invention is a method for use of a RA preamble with multiple available RACH resources. The method includes receiving (e.g., by a receiver) information that indicates a dedicated preamble and allocated resources including a plurality of RACH resources. A response including the dedicated preamble is generated (e.g., by a processor). The method also includes sending (e.g., by a transmitter) the response over at least two of the allocated resources.

In a further exemplary embodiment of the method above, the method also includes, in response to receiving a backoff message, calculating a delay time to use when resending the response.

In another exemplary embodiment of any one of the methods above, where the allocated resources include a plurality of frequency domain resources and/or a plurality of time domain resources.

In a further exemplary embodiment of any one of the methods above, sending the response includes: sending the response in a first time domain resource over a first set of frequency domain resources with a first transmission power; and resending the response in a subsequent time domain resource over a second set of frequency domain resources with a second transmission power. The allocated resources include the first time domain resource; the subsequent time domain resource; the first set of frequency domain resources and the second set of frequency domain resources. The second set of frequency domain resources may include less frequency domain resources than the first set of frequency domain resources. The second transmission power may provide more power per frequency domain resource of the second set of frequency domain resources than the first transmission power provides per frequency domain resource of the first set of frequency domain resources.

In another exemplary embodiment of any one of the methods above, the method also includes setting a transmission power to use when sending the response over the at least two of the allocated resources. The transmission power may be set evenly for each of a plurality of the at least two of the allocated resources or based at least in part on channel gain information. The method may also include receiving instructions to adjust a transmission power to use when sending the at least one response.

In a further exemplary embodiment of any one of the methods above, the method also includes determining the at least two of the allocated resources to use when sending the response. Determining may be based at least in part on link level information.

Another exemplary embodiment in accordance with this invention is an apparatus for use of a RA preamble with multiple available RACH resources. The apparatus includes one or more processor and one or more memory which includes computer program code. The one or more memory and the computer program code configured to, with the one or more processor, cause the apparatus to perform operations. The operations include to allocate resources including to receive information that indicates a dedicated preamble and allocated resources including a plurality of RACH resources; to generate a response including the dedicated preamble; and to send the response over at least two of the allocated resources.

In a further exemplary embodiment of the apparatus above, the at least one memory and the computer program code are also configured to, with the at least one processor, cause the apparatus to, in response to receiving a backoff message, calculate a delay time to use when resending the response.

In another exemplary embodiment of any one of the apparatus above, the allocated resources include a plurality of frequency domain resources and/or a plurality of time domain resources.

In a further exemplary embodiment of any one of the apparatus above, the at least one memory and the computer program code are also configured to, with the at least one processor, cause the apparatus to, where sending the response: send the response in a first time domain resource over a first set of frequency domain resources with a first transmission power; and resend the response in a subsequent time domain resource over a second set of frequency domain resources with a second transmission power. The allocated resources include the first time domain resource; the subsequent time domain resource; the first set of frequency domain resources and the second set of frequency domain resources. The second set of frequency domain resources may include less frequency domain resources than the first set of frequency domain resources. The second transmission power may provide more power per frequency domain resource of the second set of frequency domain resources than the first transmission power provides per frequency domain resource of the first set of frequency domain resources.

In another exemplary embodiment of any one of the apparatus above, the at least one memory and the computer program code are also configured to, with the at least one processor, cause the apparatus to set a transmission power to use when sending the response over the at least two of the allocated resources. The transmission power is set one of evenly for each of a plurality of the at least two of the allocated resources; and based at least in part on channel gain information. The at least one memory and the computer program code may also be configured to, with the at least one processor, cause the apparatus to receive instructions to adjust a transmission power to use when sending the at least one response.

In a further exemplary embodiment of any one of the apparatus above, the at least one memory and the computer program code are also configured to, with the at least one processor, cause the apparatus to determine the at least two of the allocated resources to use when sending the response. Determining may be based at least in part on link level information.

In another exemplary embodiment of any one of the apparatus above, the apparatus is embodied in an integrated circuit.

In a further exemplary embodiment of any one of the apparatus above, the apparatus is embodied in a mobile phone.

Another exemplary embodiment in accordance with this invention is a computer readable medium tangibly encoding a computer program comprising program instructions, execution of the program instructions resulting in actions for use of a RA preamble with multiple available RACH resources. The actions include receiving information that indicates a dedicated preamble and allocated resources including a plurality of RACH resources; generating a response including the dedicated preamble; and sending the response over at least two of the allocated resources.

In a further exemplary embodiment of the computer readable medium above, the actions also include, in response to receiving a backoff message, calculating a delay time to use when resending the response.

In another exemplary embodiment of any one of the computer readable media above, the allocated resources include a plurality of frequency domain resources and/or a plurality of time domain resources.

In a further exemplary embodiment of any one of the computer readable media above, sending the response includes: sending the response in a first time domain resource over a first set of frequency domain resources with a first transmission power; and resending the response in a subsequent time domain resource over a second set of frequency domain resources with a second transmission power. The allocated resources include the first time domain resource; the subsequent time domain resource; the first set of frequency domain resources and the second set of frequency domain resources. The second set of frequency domain resources may include less frequency domain resources than the first set of frequency domain resources. The second transmission power may provide more power per frequency domain resource of the second set of frequency domain resources than the first transmission power provides per frequency domain resource of the first set of frequency domain resources.

In another exemplary embodiment of any one of the computer readable media above, the actions also include setting a transmission power to use when sending the response over the at least two of the allocated resources. The transmission power may be set evenly for each of a plurality of the at least two of the allocated resources or based at least in part on channel gain information. The actions may also include receiving instructions to adjust a transmission power to use when sending the at least one response.

In a further exemplary embodiment of any one of the computer readable media above, the actions also include determining the at least two of the allocated resources to use when sending the response. Determining may be based at least in part on link level information.

Another exemplary embodiment in accordance with this invention is an apparatus for use of a RA preamble with multiple available RACH resources. The apparatus includes means for receiving (e.g., a receiver) information that indicates a dedicated preamble and allocated resources including a plurality of RACH resources; means for generating (e.g., a processor) a response including the dedicated preamble; and means for sending (e.g., a transmitter) the response over at least two of the allocated resources.

In a further exemplary embodiment of the apparatus above, the apparatus also includes means for, in response to receiving a backoff message, calculating (e.g., a processor) a delay time to use when resending the response.

In another exemplary embodiment of any one of the apparatus above, the allocated resources include a plurality of frequency domain resources and/or a plurality of time domain resources.

In a further exemplary embodiment of any one of the apparatus above, the sending means includes: means for sending (e.g., a transmitter) the response in a first time domain resource over a first set of frequency domain resources with a first transmission power; and means for resending (e.g., a transmitter) the response in a subsequent time domain resource over a second set of frequency domain resources with a second transmission power. The allocated resources include the first time domain resource; the subsequent time domain resource; the first set of frequency domain resources and the second set of frequency domain resources. The second set of frequency domain resources may include less frequency domain resources than the first set of frequency domain resources. The second transmission power may provide more power per frequency domain resource of the second set of frequency domain resources than the first transmission power provides per frequency domain resource of the first set of frequency domain resources.

In another exemplary embodiment of any one of the apparatus above, the apparatus also includes means for setting (e.g., a processor) a transmission power to use when sending the response over the at least two of the allocated resources. The transmission power may be set evenly for each of a plurality of the at least two of the allocated resources or based at least in part on channel gain information. The apparatus may also include means for receiving (e.g., a receiver) instructions to adjust a transmission power to use when sending the at least one response.

In a further exemplary embodiment of any one of the apparatus above, the apparatus also includes means for determining (e.g., a processor) the at least two of the allocated resources to use when sending the response. Determining may be based at least in part on link level information.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., expiry time, etc.) are not intended to be limiting in any respect, as these parameters may be identified by any suitable names. Further, the formulas and expressions that use these various parameters may differ from those expressly disclosed herein. Further, the various names assigned to different channels (e.g., RACH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
receiving information that indicates an assignment of a dedicated preamble and allocated resources comprising a plurality of random access channel resources, where use of the dedicated preamble in the allocated resources uniquely identifies a user equipment;
generating a message comprising the dedicated preamble;
sending the message over at least two of the allocated resources;
receiving an indication of reception of the message;
in response to receiving the indication, ceasing transmission of the message over remaining allocated resources in the allocated resources;
in response to receiving a backoff message, calculating a delay time to use when resending the message;
receiving a first backoff message in a first subframe;
receiving a second backoff message in a second, subsequent subframe; and
calculating a delay time to use when resending the message based on the second backoff message.

2. The method of claim 1, further comprising setting a transmission power to use when sending the message using at least two of the allocated resources.

3. The method of claim 2, where the transmission power is set one of evenly for each of a plurality of the at least two of the allocated resources; and based at least in part on channel gain information.

4. The method of claim 2, further comprising receiving instructions to adjust a transmission power to use when sending the message using at least two of the allocated resources.

5. The method of claim 1, further comprising determining at least two of the allocated resources to use when sending the message.

6. The method of claim 1, wherein the method is performed by execution of a computer program by a processor, where the computer program is tangibly embodied on a non-transitory computer readable medium.

7. The method of claim 1, wherein receiving the indication occurs during a window of time provided by the at least one of the allocated resources sent.

8. The method of claim 7, wherein each message provides a window of time; and wherein the method further comprises, for each message sent in the at least one of the allocated resources, monitoring the window of time provided by the message for an indication of reception of the message.

9. An apparatus comprising:
at least one processor; and
at least one memory including computer program code, the at least one memory and the computer program code being configured, with the at least one processor, to cause the apparatus to perform at least the following:
receiving information that indicates an assignment of a dedicated preamble and allocated resources comprising a plurality of random access channel resources, wherein use of the dedicated preamble in the allocated resources uniquely identifies a user equipment;
generating a message comprising the dedicated preamble;
sending the message over at least two of the allocated resources;
receiving an indication of reception of the message;
ceasing transmission of the message over remaining allocated resources in the allocated resources in response to receiving the indication of reception of the message;
in response to receiving a backoff message, calculating a delay time to use when resending the message;
receiving a first backoff message in a first subframe;
receiving a second backoff message in a second, subsequent subframe; and
calculating a delay time to use when resending the message based on the second backoff message.

10. The apparatus of claim 9, wherein the at least one memory and the computer program code are also configured, with the at least one processor, to cause the apparatus to determine at least two of the allocated resources to use when sending the message.

11. The apparatus of claim 9, wherein receiving the indication occurs during a window of time provided by the at least one of the allocated resources sent.

12. The apparatus of claim 11, wherein each message provides a window of time, and
wherein the at least one memory and the computer program code are also configured, with the at least one processor, to cause the apparatus, for each message sent in the at least one of the allocated resources, to monitor the window of time provided by the message for an indication of reception of the message.

13. A method comprising:
receiving information that indicates an assignment of a dedicated preamble and allocated resources comprising a plurality of random access channel resources, where use of the dedicated preamble in the allocated resources uniquely identifies a user equipment;
generating a message comprising the dedicated preamble;
sending the message over at least two of the allocated resources;
receiving an indication of reception of the message;
in response to receiving the indication, ceasing transmission of the message over remaining allocated resources in the allocated resources;
in response to receiving a backoff message, calculating a delay time to use when resending the message;
receiving a first backoff message in a first subframe;
receiving a second backoff message in the first subframe;
randomly selecting a randomly selected backoff message from one of: the first backoff message and the second backoff message; and
calculating a delay time to use when resending the message based on the randomly selected backoff message.

14. The method of claim 13, wherein the method is performed by execution of a computer program by a processor, where the computer program is tangibly embodied on a non-transitory computer readable medium.

* * * * *